3,516,810
GLASS-BONDED CRYSTALLINE MINERALS AND
METHOD OF PRODUCTION
Kenneth H. Ivey, Langley Park, Md., Sidney J. Chastain, Knoxville, Tenn., and Haskiel R. Shell, Langley Park, Md., assignors to the United States of America as represented by the Secretary of the Interior
No Drawing. Continuation-in-part of application Ser. No. 613,055, Jan. 31, 1967. This application Dec. 3, 1968, Ser. No. 780,916
Int. Cl. C03c 3/22
U.S. Cl. 65—33               11 Claims

ABSTRACT OF THE DISCLOSURE

Glass or glass-producing constituents are mixed with raw materials suitable for synthesizing minerals such as mica, amphiboles and zirconia. The mixture is heated to a temperature at which crystals of the mineral will grow and at which the glass is in a viscous state. The glass and mineral must be substantially free of boron to prevent fluxing and dissolution of the mineral. The heated mixture is then molded into shape.

---

This invention, which is a continuation-in-part of U.S. patent application Ser. No. 613,055, filed Jan. 31, 1967, now abandoned, relates to glass-bonded synthetic crystalline mineral materials such as glass-bonded mica, amphiboles, humites, norbergite, and other synthetic mineral composites.

Glass-bonding of synthetic crystalline minerals, especially mica, has been employed many years to enhance the properties thereof. Heretofore, many steps have been involved in such bonding. For example, in the production of glass-bonded synthetic mica, the mica and glass are first individually prepared from their respective raw materials. Afterwards they are ground, sized, weighed and thoroughly mixed together. Then the mix is cold-pressed into a compact mass and the resultant preform is cured and molded. All these steps may take up to fifteen days. Many problems have been encountered with glass-bonded mica made in this manner. More specifically, the product has low impact strength, low thermal shock resistance and relatively low flexural strength. Furthermore, the mica is poorly wetted by the glass.

We have now devised a new process for making glass-bonded synthetic crystalline mineral materials. Generally, the process comprises mixing glass or glass-producing constituents with the raw materials for synthesizing the mineral. The mixture is then heated to a temperature at which crystals of the mineral will grow from the mineral-producing raw materials and at which the glass forms in a viscous state. Boron must be avoided as a glass and mineral constituent. Otherwise, the glass will flux and dissolve the mineral and/or mineral-producing materials, rather than allowing crystal growth.

It is therefore an object of this invention to provide a new and improved method for making glass-bonded synthetic crystalline minerals such as glass-bonded mica, amphibole, humites, spinel, zirconia, and titania.

Another object is to provide a new, high temperature, glass-bonded synthetic mica with greatly improved impact, flexural and tensile strength.

A further object is to provide a product with a more homogeneous distribution of the mineral in the glass binder and a more uniform and controlled mineral crystal and fiber size.

Another object is to provide a process by which glass-bonded synthetic minerals can be formed in only a few steps.

A still further object is to provide a glass-bonded material wherein the synthetic mineral is thoroughly wetted by the glass.

Still another object is to simultaneously synthesize and glass-bond a mineral.

Other objects and advantages of the process and product will be obvious from the detailed description of the invention appearing in the following portion of the specification.

In the practice of this invention the basic constituents of the synthetic crystalline mineral and glass are first weighed out. A pebble mill or V-type blender is then used to thoroughly mix all the raw materials together. In place of the basic raw materials for the glass, a glass frit can be employed. Thereafter the mix is cold-pressed into compact masses such as preforms or slugs in the conventional manner employed in this art. Compression forces generally range from about 3 to about 12 tons p.s.i.g. A water binder, usually not more than 10% by weight, can be employed in the preforming step as is well known to those skilled in this art. Each compact mass is then placed in a kiln and heated to a temperature within the crystal growth temperature range of the synthetic mineral and at which temperature the glass is in a viscous state, and maintained at this temperature for a period of time to allow continued growth of the formed crystals to a predetermined crystal size or, in some cases, to a predetermined fiber size. The crystal growth temperature range for most of the minerals disclosed herein is within about 800° C. to about 1300° C. If a water binder has been employed during preforming, the water can be preliminarily driven off, prior to the kiln heating step, in an oven maintained at a temperature of about 120° C.

So as to maintain the glass phase in a desirably viscous state during heating, the mixture should preferably be heated to no more than a temperature which is about 100° C. below the melting temperature of the glass. As used throughout the specification and claims, the phrase "melting temperature" means the temperature at which the glass has a viscosity of $10^2$ poises (The American Ceramic Society Bulletin, vol. 27, No. 9, p. 358, 1948). If the mixture is heated closer to the glass melting temperature, the increasingly fluid glass phase tends to melt or dissolve some of the mineral and/or mineral-producing constituents rather than allowing crystal growth.

For glasses having a melting temperature at least about 100° C. above the minimum crystal growth temperature of the mineral being synthesized, the glass can constitute from about 5% to about 95% by weight of the glass-mineral constituent mixture. As to those lower melting glasses which have a melting point less than about 100° C. more than the minimum crystal growth temperature of the mineral being synthesized, these glasses should not be employed in amounts of more than about 25% of the glass-mineral mixture, preferably no more than about 5% of the mixture.

When mineral crystal and/or fiber growth have reached predetermined dimensions, the preform is removed from the kiln and allowed to rapidly cool in the surrounding air down to the molding temperature range. Such rapid cooling stunts and substantially prevents further fiber or crystal growth. A molding temperature ranging from about 800° C. to about 900° C. is suitable for most minerals. Conventional compression or transfer type molding is then employed to mold the product into its final form and to stop any crystal growth which may still be occurring up to this point. Pressures of about 2 to about 20 tons p.s.i.g., maintained for about 1 to about 5 minutes, generally are employed as the molding operating conditions. Thereafter the molded product, if desired, can be placed in an annealing furnace and gradually cooled (e.g., about 12 hours) to room temperature to relieve inherent stresses in the glass. Further, the final product can be machined to produce desired smoothness or other geometrical modifications.

The following examples illustrate specific products and ways in which the process can be carried out:

EXAMPLE 1

The basic raw materials for producing fluorphlogopite were weighed out in the following proportions:

| | Percent |
|---|---|
| MgO | 28.70 |
| $Al_2O_3$ | 7.44 |
| $SiO_2$ | 19.00 |
| $K_2SiF_6$ | 19.33 |
| Feldspar | 25.53 |

The basic raw materials for the glass forming composition were weighed out in the following proportions:

| | Percent |
|---|---|
| PbO | 55.0 |
| $Al_2O_3$ | 9.3 |
| $SiO_2$ | 35.7 |

All the fluorphlogopite and glass raw materials were thoroughly mixed together in a blender for 30 minutes in the following ratio: 50 percent glass forming raw material; 50 percent fluorophlogopite raw material. A pressure of 2 tons p.s.i.g. was then used to cold-press the mix into preform, and the preform was placed in a kiln and heated to a temperature of 1100° C., and maintained at this temperature for one hour. During this heating step the following reactions occurred:

At 800° C.—The material was dry. The glass forming components formed a glass, and initial crystal development occurred.

At 800–1000° C.—The crystals of the synthetic minerals reached 1–2 microns in size and were still increasing.

At 1000–1100° C.—Fluorphlogopite mica, lead mica, fibrous humite, minute spinel particles, and a crystalline form of norbergite (with the fluorphlogopite predominating) continued to grow.

At 1100° C.—The crystal size increased to 3–5 microns during a one hour soak at this temperature.

The preform was then removed from the kiln and allowed to rapidly cool in the surrounding air to a temperature of about 880° C., after which it was transferred to a compression type mold heated to 625° C. A pressure of 2–5 tons p.s.i.g. for a period of 1–3 minutes was then used to mold the product. After removing the material from the mold, it was placed in an annealing furnace heated to a temperature of 625° C., and the material was gradually cooled to room temperature in the furnace in approximately 12 hours.

The final product was a glass-bonded material which contained a glass, one or more fluormicas, plus small amounts of a fibrous humite material, minute spinel particles, and a crystalline form of norbergite. The last three materials enhanced the properties of the glass-bonded product by increasing the flexural, impact, and tensile strength, as well as resistance to thermal shock.

Results and properties.—Easily formed by transfer and compression molding; product was impervious (zero porosity) with increased impact strength; dielectric constant—7.55; dissipation factor (ASTM)—.0013; loss factor (ASTM)—.0098; flexural strength—17,000 p.s.i.; and density—3.65.

EXAMPLE 2

Raw materials and procedure were essentially the same as that employed in Example 1, except that the fluorphlogopite raw material-glass raw material ratio was 75:25. Further, since the mineral composition in relation to the glassy phase was exceedingly high, a substantial increase in temperature (1300° C.) was required to obtain the crystalline phase. The material had to be molded at a higher temperature (750° C.) than Example 1 in order to quench or stunt the crystalline growth.

Results and properties.—The high mineral content naturally made the finished body more resistant to thermal shock as well as increasing the end use temperature of the material; product was impervious (zero porosity) with greatly increased impact strength; dielectric constant—7.40; dissipation factor—.0012; loss factor—.0080; flexural strength—16,000 p.s.i.; and density—3.58.

EXAMPLE 3

The basic raw materials for producing barium mica were weighed out in the following proportions:

| | Percent |
|---|---|
| $BaCO_3$ | 32.59 |
| $MgSiF_6$ | 19.99 |
| $Al_2O_3$ | 16.83 |
| MgO | 17.47 |
| $SiO_2$ | 16.12 |

The basic raw materials for the glass forming composition were weighed out in the following proportions:

| | Percent |
|---|---|
| $K_2O$ | 3.0 |
| $Na_2O$ | 1.6 |
| CaO | 15.8 |
| MgO | 4.3 |
| BaO | 10.6 |
| ZnO | 8.7 |
| $Al_2O_3$ | 7.0 |
| $SiO_2$ | 49.0 |

All the raw materials were mixed together, cold-pressed, molded and annealed in essentially the same manner and same mica-glass ratio employed in Example 1.

Results and properties.—Easily formed by transfer and compression molding; product was impervious (zero porosity) with greatly improved impact strength; dielectric constant—7.5; dissipation factor—.0009; loss factor—.0067; flexural strength 16,000 p.s.i.; and density 2.8 g./cc.

EXAMPLE 4

Raw materials and procedure were essentially the same as that employed in Example 3 except that the mica-glass ratio was 40:60. As expected, the crystalline phase formed at a lower temperature (1000° C.) than in the preceding examples. Further, the final product was thermally stable at a lower temperature than the other examples.

Results and properties.—The finished product had an end use range of 500–550° C. It was more susceptible to thermal shock due to the higher percentage of glass and the lower percentages of mica and fibrous minerals. The product was impervious (zero porosity) with increased impact strength as compared to ordinary glass-bonded mica; dielectric constant—7.70; dissipation factor—.0014; loss factor—.011; flexural strength—18,000 p.s.i.; and density—3.70.

EXAMPLE 5

The basic raw materials for producing fluoroamphibole were weighed out in the following proportions:

| | Percent |
|---|---|
| NaF | 9.71 |
| $CaCO_3$ | 11.55 |
| MgO | 23.27 |
| $SiO_2$ | 55.47 |

The basic raw materials for the glass forming composition were weighed out in the following proportions:

| | Percent |
|---|---|
| PbO | 51.0 |
| $Al_2O_3$ | 11.4 |
| $SiO_2$ | 37.6 |

All the fluoroamphibole and glass raw materials were thoroughly mixed together in a blender for 30 minutes in the following ratio: 50 percent glass forming raw material; 50 percent fluoroamphibole raw materials and the The following table shows various glasses that have been employed in the practice of the present invention:

| Glass No. | Percent | | | | | | | | | |
|---|---|---|---|---|---|---|---|---|---|---|
| | K$_2$O | Na$_2$O | CaO | MgO | BaO | ZnO | Al$_2$O$_3$ | SiO$_2$ | ZrO$_2$ | PbO |
| 1 | | 16.6 | .30 | .70 | | | 5.9 | 76.5 | | |
| 2 | 12.0 | 4.6 | 12.2 | 17.8 | | | 18.8 | 42.6 | | |
| 3 | 2.8 | 1.5 | 15.6 | 1.0 | 3.7 | 18.2 | 6.8 | 46.0 | 4.4 | |
| 4 | 3.0 | 1.6 | 15.8 | 4.3 | 10.6 | 8.7 | 7.0 | 49.0 | | |
| 5 | 5.0 | 1.4 | 13.2 | 1.1 | 15.5 | 14.4 | 7.9 | 51.5 | | |
| 6 | | | | 3.3 | 16.1 | | 19.6 | 61.0 | | |
| 7 | 1.5 | 6.1 | 7.2 | | | | 5.8 | 60.5 | 9.9 | |
| 8 | | | | | | 50.9 | 14.8 | 34.3 | | |
| 9 | | | 23.2 | | | | 14.9 | 61.9 | | |
| 10 | | | | | | | 7.0 | 31.7 | | 61.3 |
| 11 | | | | | | | 3.1 | 35.6 | | 61.3 |
| 12 | | | 5.6 | | | | | 26.8 | | 67.6 |
| 13 | | 1.5 | | | | | 2.4 | 24.9 | | 71.2 |
| 14 | | 1.2 | | | | 20.0 | 2.0 | 20.0 | | 56.8 |
| 15 | 2.5 | 1.2 | 8.1 | | | | 5.2 | 49.3 | | 33.7 |
| 16 | | 1.6 | | | | | 3.8 | 40.4 | | 54.2 |
| 17 | | | | | | | 20.0 | 30.0 | | 50.0 | procedure in Example 1 was followed to form the end product. The end product contained no fluoromica. The final product was a glass-bonded material containing a glass, fluoroamphibole fiber and/or needles, plus small amounts of a fibrous humite material and minute spinel particles, all of which improve the impact and thermal shock properties.

Results and properties.—Easily formed by transfer and compression molding: product was impervious (zero porosity) with increased impact strength; dielectric constant—7.81; dissipation factor—.0010; loss factor—.008 and flexural strength—21,000 p.s.i.

With regard to Example 5, varied amounts of TiO$_2$ and/or ZrO$_2$ could have been employed to control the dielectric constant (K) from 10.0 to 30. This is accomplished by adding from 2–28 percent of TiO$_2$ and/or ZrO$_2$. If a dielectric constant of 15 is desired the addition of 12 percent TiO$_2$ will increase the "K" factor to this point. However, with the addition of percentages of TiO$_2$ or ZrO$_2$ equal percentages of the glass and fluoroamphibole must be dropped. If 12 percent TiO$_2$ is added then 6 percent glass and 6 percent fluoroamphibole must be dropped.

As stated previously the process of the present invention is applicable to the production of other glass-bonded synthetic crystalline minerals besides mica and amphiboles such as humites, spinel, zirconia and titania. Likewise, all synthetic micas including fluorphlogopite, boron, barium, and taeniolite can be made by this process.

By producing a glass-bonded product in the described manner, the necessity of making single mineral melts to obtain the synthetic mineral, the necessity of grinding and classifying particles, and of using standard fritted glass has been eliminated by the creation of the glass and mineral during the bonding process. Therefore, the production costs of glass-bonded synthetic minerals have been considerably reduced along with the impurities found in conventionally made glass-bonded minerals.

Further, the final crystal and fiber size of the mineral in the molded product can be readily controlled because supercooling and molding occur immediately after formation of the mineral. Other advantages reside in the fact that the process provides a glass-bonded material which is readily castable in desired shapes and can be both transfer and compression molded. Furthermore, partial devitrification during the annealing step may be used to control crystal or grain size. With specific regard to glass-bonded synthetic mica, the final product is resistant to $1.6 \times 10''$ ergs g.$^{-1}$/(c) and $1.7 \times 10''$ N/cm.$^2$ fast neutrons radiation up to 775° C.

While the particular process and resultant product herein described is well adapted to carry out the objects of the present invention, it is to be understood that various modifications and changes may be made all coming within the scope of the following claims.

As examples of the range of use of glass in the practice of the present invention, glass No. 9 was employed in an amount of 95% of the glass-mineral mixture while glass No. 13 constituted 5% of its respective mixture.

As stated previously, the process of the present invention is applicable to the production of other glass-bonded synthetic crystalline minerals besides mica and amphiboles such as humites, spinel, zirconia and titania. Likewise, all synthetic, substantially boron-free micas including fluorphlogopite, intermediate-fluorphlogopite, barium, lead disilicic and taeniolite micas can be made by this process.

By producing a glass-bonded product in the described manner, the necessity of making single mineral melts to obtain the synthetic mineral, the necessity of grinding and classifying particles, and of using standard fritted glass has been eliminated by the creation of the glass and mineral during the bonding process. Therefore, the production costs of glass-bonded synthetic minerals have been considerably reduced along with the impurities found in conventionally made glass-bonded minerals.

Further, the final crystal and fiber size of the mineral in the molded product can be readily controlled because supercooling and molding occur immediately after formation of the mineral. Other advantages reside in the fact that the process provides a glass-bonded material which is readily castable in desired shapes and can be both transfer and compression molded. Furthermore, partial devitrification during the annealing step may be used to control crystal or grain size. With specific regard to glass-bonded synthetic mica which is substantially free of lithium, the final product is resistant to $1.6 \times 10^{11}$ ergs g.$^{-1}$/(c) and $1.7 \times 10^{11}$ N/cm.$^2$ fast neutrons radiation up to 775° C.

While the particular process and resultant product herein described is well adapted to carry out the objects of the present invention, it is to be understood that various modifications and changes may be made all coming within the scope of the following claims.

What is claimed is:
1. A process for producing a glass-bonded crystalline mineral from a synthetic mineral and a silica-containing glass composition, said mineral and glass composition being substantially free of boron, said synthetic mineral selected from the group consisting of mica, amphiboles, humites, spinel, zirconia, norbergite, and titania, comprising
   (a) thoroughly mixing said glass composition together with raw materials which combine to form said synthetic mineral when heated to within the crystal growth temperature range of said synthetic mineral, wherein said glass composition is selected from the group consisting of (a) a first glass composition having a melting temperature at least 100° C. above the minimum temperature at which crystals of said syn- thetic mineral will grow, and (b) a second glass composition having a melting temperature less than 100° C. above said minimum temperature; wherein said first glass composition is mixed with said raw materials in a glass composition-raw materials weight ratio of about 5:95 to about 95:5, and wherein said glass composition is mixed with said raw materials in a glass composition-raw materials weight ratio of about 5:95 to about 25:75;

(b) cold-pressing said mixture together into a compact mass;

(c) heating said compact mass directly to a temperature within the crystal growth temperature range of said synthetic mineral, and at which temperature said glass composition forms a viscous phase in which formation and growth of crystals of said synthetic mineral occurs to thereby form a viscous glass phase containing crystals of said mineral; and (d) molding said crystal-containing viscous phase to produce said glass bonded synthetic mineral.

2. The process of claim 1 wherein said glass composition constitutes about 5% of said mixture.

3. The process of claim 1 wherein said mixture is heated to a temperature of about 800° C. to about 1300° C. during said heating step.

4. The process of claim 1 wherein said glass composition contains alumina.

5. The process of claim 3 wherein said mixture is heated to above 900° C. during said heating step, and is supercooled to about 800°–900° C. prior to said molding step.

6. The process of claim 1 wherein said glass composition consists of raw materials which combine to form said viscous phase when said compact mass is heated to said temperature within the crystal growth range.

7. The process of claim 1 wherein said glass composition consists of a glass frit.

8. The process of claim 1 wherein said synthetic mineral is synthetic mica selected from the group consisting of fluorphlogopite, intermediate-fluorphlogopite, barium, lead disilicic, and taeniolite micas.

9. The process of claim 7 wherein said synthetic mineral is synthetic mica selected from the group consisting of fluorphlogopite, intermediate-fluorphlogopite, barium, lead disilicic, and taeniolite micas.

10. The process of claim 8 wherein said mineral is fluoromica.

11. The process of claim 1 wherein said compact mass is heated to no more than a temperature which is about 100° C. below the melting temperature of said glass composition, and wherein said glass composition is said first glass composition.

References Cited
UNITED STATES PATENTS

| | | | |
|---|---|---|---|
| 3,024,118 | 3/1962 | Hessinger et al. | 65—18 XR |
| 3,338,692 | 8/1967 | Hessinger et al. | 65—18 |

S. LEON BASHORE, Primary Examiner

J. H. HARMAN, Assistant Examiner

U.S. Cl. X.R.

65—18; 106—39